US011677514B2

United States Patent
Wu et al.

(10) Patent No.: US 11,677,514 B2
(45) Date of Patent: Jun. 13, 2023

(54) HYBRID AUTOMATIC REPEAT REQUEST (HARQ) RETRANSMISSION USING MULTIPLE TIMERS

(71) Applicant: Nokia Technologies Oy, Espoo (FI)

(72) Inventors: Chunli Wu, Beijing (CN); Claudio Rosa, Randers NV (DK); Samuli Heikki Turtinen, Ii (FI); Tao Tao, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 225 days.

(21) Appl. No.: 16/845,576

(22) Filed: Apr. 10, 2020

(65) Prior Publication Data

US 2020/0351031 A1 Nov. 5, 2020

(30) Foreign Application Priority Data

Apr. 30, 2019 (WO) ................. PCT/CN2019/085247

(51) Int. Cl.
*H04L 1/1829* (2023.01)
*H04W 72/04* (2023.01)

(52) U.S. Cl.
CPC ........... *H04L 1/1861* (2013.01); *H04W 72/04* (2013.01)

(58) Field of Classification Search
CPC ... H04L 1/1861; H04L 1/1854; H04L 1/1812; H04L 1/1822; H04L 1/188;
(Continued)

(56) References Cited

U.S. PATENT DOCUMENTS

2019/0052416 A1* 2/2019 Babaei .................... H04L 1/188
2019/0386780 A1* 12/2019 Zou ........................ H04L 1/1657
(Continued)

FOREIGN PATENT DOCUMENTS

CN 105122858 A 12/2015
CN 105580445 A 5/2016
(Continued)

OTHER PUBLICATIONS

U.S. Appl. No. 62/835,974 (Year: 2019).*
(Continued)

*Primary Examiner* — Rushil Parimal Sampat
(74) *Attorney, Agent, or Firm* — Squire Patton Boggs (US) LLP

(57) ABSTRACT

Apparatuses, methods and software are provided. The first apparatus comprises at least one processor; and at least one memory including computer program codes; the at least one memory and the computer program codes are configured to, with the at least one processor, cause the device at least to transmit a transport block of a HARQ process on preconfigured resources for an uplink transmission to a second apparatus while starting a first timer and a second timer for the HARQ process. The first timer indicates a time period during which the transport block is able to be retransmitted, and wherein the second timer is configured to expire before the first timer; monitor a response associated with the transport block from the second apparatus; and in response to the second timer expiring before receiving the response and before expiry of the first timer, retransmit the transport block while restarting the second timer.

18 Claims, 4 Drawing Sheets

(58) Field of Classification Search
CPC .. H04L 43/0864; H04L 1/1887; H04W 72/04; H04W 76/18; H04W 76/28
See application file for complete search history.

(56) References Cited

U.S. PATENT DOCUMENTS

2020/0337083 A1* 10/2020 Loehr ............... H04W 72/1263
2021/0176015 A1* 6/2021 Xu ......................... H04L 1/189

FOREIGN PATENT DOCUMENTS

| WO | 02/073893 | A1 | 9/2002 |
|----|-----------|-----|--------|
| WO | 2005/112331 | A2 | 11/2005 |
| WO | 2018/067405 | A1 | 4/2018 |
| WO | 2018/172862 | A1 | 9/2018 |

OTHER PUBLICATIONS

Tentative Rejection received for corresponding Taiwan Patent Application No. 109113080, dated Jan. 27, 2021, 15 pages of office action and 5 pages of Translation available.

Office action received for corresponding Bangladesh Patent Application No. 146/2020, dated Jun. 16, 2021, 2 pages.

"Configured grant timer(s) for NR-U", 3GPP TSG-RAN WG2 Meeting #105bis, R2-1903713, Agenda : 11.2.1.2, Nokia, Apr. 8-12, 2019, 2 pages.

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

International Search Report and Written Opinion received for corresponding Patent Cooperation Treaty Application No. PCT/CN2019/085247, dated Feb. 1, 2020, 9 pages.

"Enhancements of configured grant in NR-U", 3GPP TSG-RAN WG2 Meeting #103bis, R2-1813588, Agenda 11.2.1.2, OPPO, Oct. 8-12, 2018, pp. 1-5.

"Considerations on configured grant for NR-U", 3GPP TSG RAN WG2 NR#103bis Meeting, R2-1813743, Agenda : 11.2.1.2, ZTE, Oct. 8-12, 2018, 4 pages.

Extended European Search Report received for corresponding European Patent Application No. 19926790.7, dated Nov. 19, 2021, 8 pages.

"Configured UL grant enhancement for NR Unlicense", 3GPP TSG-RAN WG2 105 , R2-1900719, Agenda : 11.2.1.2, Intel Corporation, Feb. 25-Mar. 1, 2019, 4 pages.

Chinese Office Action corresponding to CN Application No. 201980012507.X, dated Sep. 16, 2022.

* cited by examiner

HYBRID AUTOMATIC REPEAT REQUEST (HARQ) RETRANSMISSION USING MULTIPLE TIMERS

RELATED APPLICATION

The present application claims priority from PCT Application No. PCT/CN2019/085247, filed Apr. 30, 2019, which is hereby incorporated in its entirety.

FIELD

Embodiments of the present disclosure generally relate to the field of telecommunication and in particular, to methods, devices, apparatuses and computer readable storage media for configured grant operation.

BACKGROUND

Currently, for an Uplink (UL) Configured Grant (CG) operation, two different behaviours have been defined regarding to the CG timer. For Further enhanced Licensed Assisted Access (FeLAA), assuming that the UE may receive NACK from the BS upon expiry of the CG timer to autonomously initiate retransmission for a Hybrid Automatic Repeat Request (HARQ) process on a CG resource. For the New Radio (NR), assuming that the UE may receive ACK from the BS upon expiry of the CG timer to allow new transmission on a CG resource for the same process.

The CG timer defined for NR to prevent the UE to use the HARQ process for new transmission on a certain period when the UE may wait for performing a potential retransmission, while the CG timer defined for FeLAA to allow automatic retransmission on a CG resource when no UL dynamic grant or feedback is received after the certain period.

SUMMARY

In general, example embodiments of the present disclosure provide a solution for configured grant operation.

In a first aspect, there is a first apparatus. The first apparatus comprises at least one processor; and at least one memory including computer program codes; the at least one memory and the computer program codes are configured to, with the at least one processor, cause the first apparatus at least to transmit a transport block of a Hybrid Automatic Repeat Request process on preconfigured resources for an uplink transmission to a second apparatus while starting a first timer and a second timer for the Hybrid Automatic Repeat Request process, wherein the first timer indicates a time period during which the transport block is able to be retransmitted on the preconfigured resources, and wherein the second timer is configured to expire before the first timer; monitor a response associated with the transport block from the second apparatus; and in response to the second timer expiring before receiving the response and before expiry of the first timer, retransmit the transport block while restarting the second timer.

In a second aspect, there is a first apparatus. The first apparatus comprises at least one processor; and at least one memory including computer program codes; the at least one memory and the computer program codes are configured to, with the at least one processor, cause the first apparatus at least to determine, at the first apparatus, whether at least one prior transport block on a Hybrid Automatic Repeat Request process to be retransmitted on preconfigured resources for an uplink transmission; and in response to determining that at least one prior transport block is to be retransmitted, retransmit the at least one prior transport block on the preconfigured resources.

In a third aspect, there is provided a method. The method comprises transmitting a transport block of a Hybrid Automatic Repeat Request process on preconfigured resources for an uplink transmission to a second apparatus while starting a first timer and a second timer for the Hybrid Automatic Repeat Request process, wherein the first timer indicates a time period during which the transport block is able to be retransmitted on the preconfigured resources, and wherein the second timer is configured to expire before the first timer; monitoring a response associated with the transport block from the second apparatus; and in response to the second timer expiring before receiving the response and before expiry of the first timer, retransmitting the transport block while restarting the second timer.

In a fourth aspect, there is provided a method. The method comprises determining, at the first apparatus, whether at least one prior transport block of a Hybrid Automatic Repeat Request process to be retransmitted on preconfigured resources for an uplink transmission; and in response to determining that at least one prior transport block is to be retransmitted, retransmitting the at least one prior transport block on the preconfigured resources.

In a fifth aspect, there is provided an apparatus comprises means for transmitting a transport block of a Hybrid Automatic Repeat Request process on preconfigured resources for an uplink transmission to a second apparatus while starting a first timer and a second timer for the Hybrid Automatic Repeat Request process, wherein the first timer indicates a time period during which the transport block is able to be retransmitted on the preconfigured resources, and wherein the second timer is configured to expire before the first timer; means for monitoring a response associated with the transport block from the second apparatus; and means for in response to the second timer expiring before receiving the response and before expiry of the first timer, retransmitting the transport block while restarting the second timer.

In a sixth aspect, there is provided an apparatus comprises means for determining, at the first apparatus, whether at least one prior transport block of a Hybrid Automatic Repeat Request process to be retransmitted on preconfigured resources for an uplink transmission; and in response to determining at least one prior transport block to be retransmitted, means for in response to determining at least one prior transport block to be retransmitted, retransmitting the at least one prior transport block on the preconfigured resources.

In a seventh aspect, there is provided a computer readable medium having a computer program stored thereon which, when executed by at least one processor of a device, causes the device to carry out the method according to the third aspect.

In a seventh aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
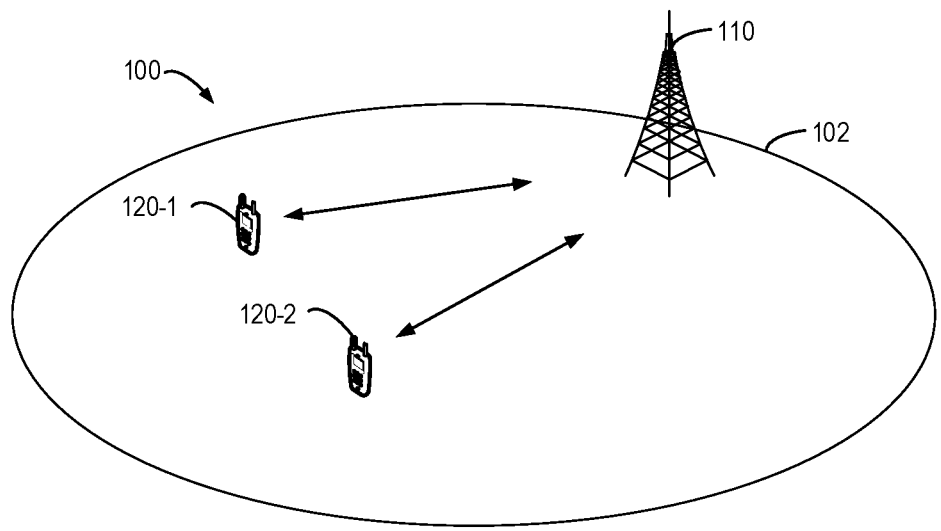
FIG. 1 shows an example communication network in which example embodiments of the present disclosure may be implemented.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 1 shows an example communication network 100 in which embodiments of the present disclosure can be implemented. The network 100 includes a network device 120 and terminal devices 120-1 and 120-2 (hereinafter collectively referred to as terminal devices 120 or individually referred to as a terminal device 110) served by the network device 120. The serving area of the network device 120 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be in the cell 102 and served by the network device 120.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As described above, for an Uplink (UL) Configured Grant (CG) operation, two different behaviours have been defined regarding to the CG timer. For Further enhanced Licensed Assisted Access (FeLAA), assuming that the UE may receive NACK from the BS upon expiry of the CG timer to autonomously initiate retransmission for a Hybrid Automatic Repeat Request (HARQ) process on a CG resource. For the New Radio (NR), assuming that the UE may receive ACK from the BS upon expiry of the CG timer to allow new transmission on a CG resource for the same process.

The CG timer defined for NR to prevent the UE to use the HARQ process for new transmission on a certain period when the UE may wait for performing a potential retransmission, while the CG timer defined for FeLAA to allow automatic retransmission on a CG resource when no UL dynamic grant or feedback is received after the certain period.

RAN1 has decided to adopt the CG timer defined for FeLAA for the timer operation for configured grant for NR-Unlicensed (NR-U) which introduces a different behavior as compared to the NR baseline. The CG timer defined for FeLAA is introduced for auto retransmission (i.e. timer expiry=HARQ NACK) on configured grant for the case of the Transport Block (TB) previous being transmitted on configured grant resources, such CG time may be referred to as "CG retransmission timer."

The CG retransmission timer may be started when the TB is actually transmitted on the configured grant and stopped upon reception of HARQ feedback (DFI) or dynamic grant for the HARQ process.

The legacy configured grant timer, i.e. the CG timer defined for NR as mentioned above, may be referred to as "CG timer". The behavior of the CG timer may be kept for preventing the configured grant overriding the TB scheduled by dynamic grant, i.e. it is (re)started upon reception of the Physical Downlink Control Channel (PDCCH) as well as transmission on the Physical Uplink Share Channel (PUSCH) of dynamic grant.

It was also agreed that both the CG retransmission timer and the CG timer may not be started if the TB is not transmitted due to Listen Before Talk (LBT) failure and the Protocol Data Unit (PDU) overwrite needs to be avoided as currently the HARQ process can be used for new transmissions when the timer is not running. For example, assuming that the configured grant timer is not started/restarted when configured grant is not transmitted due to LBT failure. The PDU overwrite need to be avoided. The configured grant timer is not started/restarted when UL LBT fails on PUSCH transmission for grant received by PDCCH addressed to Configured Scheduling Radio Network Temporary Identifier (CS-RNTI) scheduling retransmission for configured grant and The configured grant timer is not started/restarted when the UL LBT fails on PUSCH transmission for UL grant received by PDCCH addressed to Cell Radio Network Temporary Identifier (C-RNTI), which indicates the same HARQ process configured for configured uplink grant.

It was also agreed that auto retransmission on configured grant is not allowed for a TB previously transmitted on a dynamic grant. That is, it is not allowed that the retransmission of a TB using configured grant resources, when initial transmission or a retransmission of the TB was previously done using dynamically scheduled resources.

Besides, for HARQ operation, it was agreed the UE can select the process ID to be used for a configured grant and it will indicate the HARQ process ID/Redundancy Version (RV) in the plink Control Information (UCI).

However, it may not be determined that whether and how the two timers, i.e. the "CG timer" and "CG retransmission timer" as mentioned above, run at the same time. Furthermore, it may not be determined that how the UE selects the TB to be transmitted/retransmitted on the next configured grant occasion to avoid overriding.

Therefore, the present disclosure proposes a new solution for the configured grant operation by introducing a mechanism for HARQ process selection and allows two timers, which may have different behaviors respectively, to run for the HARQ processes at the same time.

Figure 2:
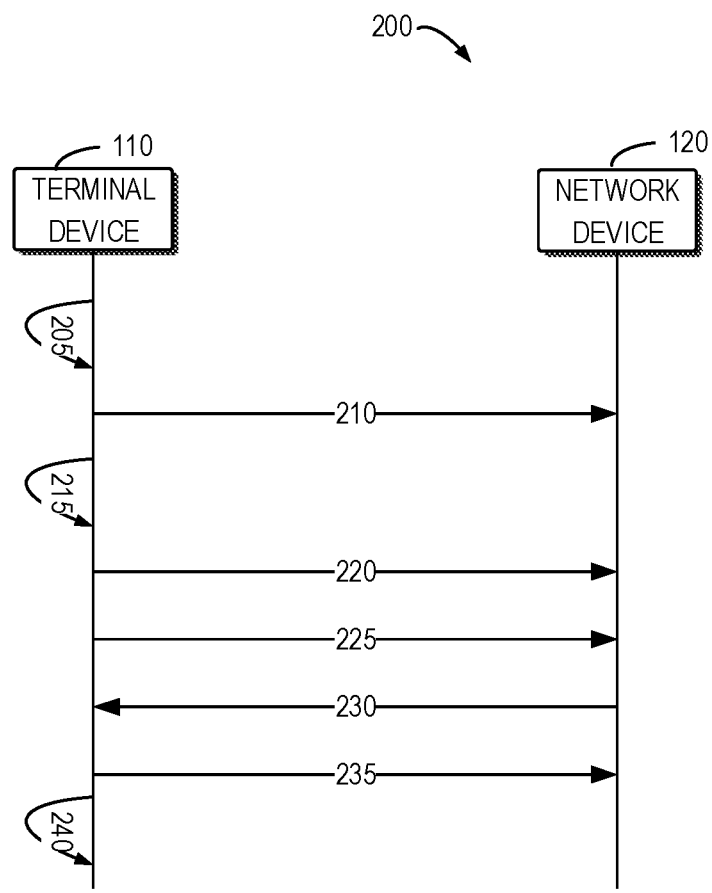
FIG. 2 shows a schematic diagram illustrating a process for configured grant operation according to example embodiments of the present disclosure.

FIG. 2 shows a schematic diagram of a process 200 for configured grant operation according to example embodiments of the present disclosure. For the purpose of discussion, the process 200 will be described with reference to FIG. 1. The process 200 may involve the terminal device 110 and the network devices 120 as illustrated in FIG. 1.

A configured grant uplink occasion may be occurred in a predetermined time point, for example, in every 10 ms. A set of HARQ processes are configured to be used for configured grant. For a configured grant uplink occasion, the terminal device 110 may determine which TB or HARQ process should be transmitted on this configured grant resources. As shown in FIG. 2, in order to avoid the PDU overwriting when a TB does not get retransmission opportunity for a long time, the terminal device 110 may determine 205 whether there is at least one prior TB to be retransmitted before selecting a HARQ process for new transmission.

As used herein, the term "configured grant resources" may refer to any preconfigured resources for the uplink transmission without scheduling dynamically from a network device via a Physical Downlink Control Channel (PDCCH). The "configured grant resources" herein may be referred as, for example, configured grant UL resources defined in NR, autonomous uplink resources in LTE, a grant-free resources, etc.

In some example embodiments, the terminal device 110 may maintain the two timers for each HARQ process, i.e. the CG timer and the CG retransmission for a TB transmission to determine whether the transmission of this TB is completed. For a transmission of TB, the two timers may be started simultaneously when a TB is started to transmit.

In some example embodiments, the CG timer and the CG retransmission timer may have different expiration time respectively. The CG timer may indicate a time period during which the transport block can be retransmitted on the configured grant resources and the CG timer may indicate a time period before preforming the retransmission automatically when no feedback received from the network device 120. The second timer may be configured to expire before the first timer.

Therefore, by means of the two timers per HARQ process, the terminal device 110 may determine whether there is at least one prior TB of any process to be retransmitted when determine which HARQ process to select for configured grant resources (the coming configured grant resources). If the terminal device 110 determine at least one prior TB of a HARQ process to be retransmitted, the terminal device 110 may retransmit 210 the at least one prior TB instead of building a new TB on another HARQ process.

In some example embodiments, the terminal device 110 may determine more than HARQ processes have TBs pending for retransmission. The terminal device 110 may further determine which prior TB should be retransmitted first on the configured grant resources. For example, two HARQ processes may be have TB pending for retransmission at the terminal device 110. For each TB on the corresponding HARQ of the two HARQ processes, the CG timer and the CG retransmission timer may be started when a TB is started to transmit.

For example, in a case that the terminal device 110 determines a first prior TB of a first HARQ process and a second prior TB of a second HARQ process to be retransmitted, the terminal device 110 may determine which prior TB should be retransmitted first.

In some example embodiments, based on the two timers of each previous, the terminal device 110 may determine a time duration left for a retransmission of the first prior transport block on a first HARQ process and a time duration left for a retransmission of the second prior transport block on a second HARQ process. The terminal device 110 may compare the time duration and the time duration. If the terminal device 110 determines that the time duration is less than the time duration, the terminal device 110 may retransmit the first prior transport block.

The time duration left for a transmission of a prior TB in a HARQ process may be obtained by the value of the CG timer. The CG timer having the highest value of a plurality of CG timers means the HARQ process has the least time left for retransmission.

In some example embodiments, the terminal device 110 may determine the prior TB to be retransmitted based on the priority of the HARQ process or a TB. For example, a terminal device may prioritize TB with the highest priority data multiplexed. This check can be based on, for example, highest priority among the Logical Channels (LCHs) multiplexed in the TB.

In some example embodiments, the terminal device 110 may determine the prior TB to be retransmitted based on the retransmission attempt time of the process or a TB. The process or the TB having the highest number of the retransmission attempt times may be retransmitted on this configured grant resources first.

In some example embodiments, if the terminal device 110 determines 215 no prior TB to be retransmitted, the terminal device 110 may initiate 220 a new TB transmission on an available HARQ process.

As an option, the terminal device 110 may build a new TB based on data in the data buffer of the terminal device 110. Alternatively, a new TB may have been already prepared at a previous time point. For example, at a time point that a prior TB has been transmitted and its CG retransmission timer does not expire. At that time, the terminal device 110 may not determine whether a prior TB should be retransmitted since retransmission can only happen after expiry of the CG retransmission timer.

When the new TB is transmitted from the terminal device 110 to the network device 120, as mentioned above, the CG timer and the CG retransmission time may be started. The terminal device 110 may monitor a response associated with the transport block from the network device 120. If the CG retransmission timer expires before receiving the response, the terminal device 110 may retransmit 225 the new TB while restart the CG retransmission timer.

In some example embodiments, if the retransmission is performed, the CG timer may also be restarted. Alternative, the CG timer may be kept running, i.e., not be restarted upon retransmission of a TB but only (re)started at initial transmission of a TB on configured grant.

In some example embodiments, before the retransmission of the TB, the terminal device 110 may determine whether the configured grant resources are available, for example, by means of LBT. If the terminal device 110 determines the configured grant resources are available, the terminal device 110 may retransmit the TB on the configured grant resources. If the terminal device 110 determines the configured grant resources is not available, then the terminal device 110 may suspending the retransmission until the configured grant resources are available.

In some example embodiments, the network device 120 may transmit 230 a response indicating that the TB has been received by the network device 120. That is, the terminal device 110 may receive a response associated with the transport block from the network device 120 before the CG retransmission timer expires.

In some case, the network device may be received the TB but cannot decode the TB due to the loss of data. The network device 120 may require the terminal device 110 retransmit the TB and allocates the corresponding resources for a UL transmission via PDCCH. Therefore, in some example embodiments, if the terminal device 110 receives a response indicates a dynamic grant resource for retransmitting the transport block, terminal device 110 may retransmit 235 the TB on the dynamic grant resource to the network device 120 while restarting the CG timer. If a TB has been retransmitted on a dynamic grant resource, this TB may not be allowed to retransmit on the configured grant resources anymore. Thus, the CG retransmission timer of this TB may be stopped.

If the network device 120 determines that the retransmission of the TB is not required, the terminal device 110 may receive a response indicating a successful reception of the TB by the network device 120. The terminal device 110 may terminate 240 the transmission of TB ends. In this case, both the CG timer and the CH retransmission timer may be stopped.

In view of above, the behaviour for the two timers is summarized in the table below.

TABLE 1 behaviour for the two timers

| Timer | Start | Stop | Expiry |
|---|---|---|---|
| CG Timer | Activation of the configured grant; PDCCH reception; PUSCH transmission on configured grant (either initial tx only or then always); PUSCH transmission on dynamic grant | Deactivation of the configured grant | ACK assumed. The process can be used for new transmission on configured grant. |

TABLE 1-continued behaviour for the two timers

| Timer | Start | Stop | Expiry |
|---|---|---|---|
| CG retransmission timer | Activation of the configured grant and PUSCH transmission on configured grant | Deactivation of the configured grant. PDCCH reception for the HARQ process or HARQ feedback reception. | NACK assumed. Auto retransmission on configured grant depending on the UE HARQ process selection. |

Figure 3:
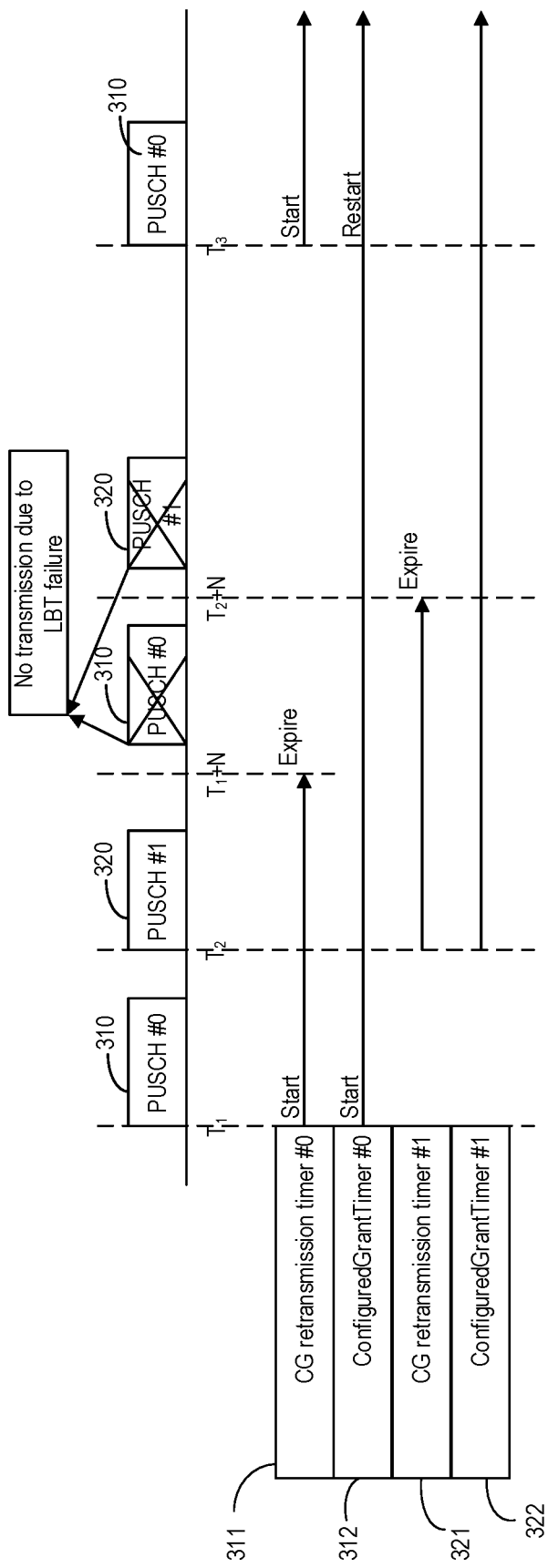
FIG. 3 shows a diagram of an example Hybrid Automatic Repeat Request (HARQ) process selection on the configured grant resources according to some example embodiments of the present disclosure.

FIG. 3 shows a diagram of an example HARQ process selection on the configured grant resources according to some example embodiments of the present disclosure.

As shown in FIG. 3, the terminal device 110 may prepare data for transmission using HARQ process ID #0 310. Upon PUSCH transmission on UL configured grant resources at time T1, both the CG Timer 312 and the CG retransmission timer 311 for HARQ process ID #0 310 are (re)started.

The terminal device 110 may then prepare data for transmission using HARQ process ID #1 320. Upon PUSCH transmission on UL configured grant resources at time # T2, both the CG Timer 322 and the CG retransmission timer 321 for HARQ process ID #1 320 are (re)started.

No feedback is received from the network device 120 for either HARQ process ID #0 310 and #1. The CG retransmission timer 311 expires at time # T1+N for HARQ process ID #0 310 and the CG retransmission timer 321 expires at time # T2+N for HARQ process ID #1 320, respectively (N=value of the respective CG retransmission timer). The terminal device 110 could start retransmission for process ID #0 310 and HARQ process ID #1 320 on UL CG resources in sequence, but UL LBT fails. That is, the retransmission could not be performed.

Before the time T1+N, new data may arrive in the data buffer of the terminal device 110 and the terminal device 110 may prepare new TB to be transmitted on UL CG resources using for example, HARQ process ID #2 (not shown in FIG. 3).

At time # T3, UL LBT is successful in correspondence of UL GC resources. The CG timer 312 and 322 for both HARQ processes #0 310 and #1 320 is still running. The terminal device 110 prioritizes retransmissions (i.e. HARQ processes ID #0 310 and #1 320) over first transmissions (HARQ process ID #2), and in particular it prioritizes the retransmission with largest value of running CG timer (i.e. HARQ processes ID #0 310 over HARQ process ID #1 320). That is, the terminal device 110 may prioritize retransmission of HARQ process ID #0 310.

According to the solution of the present disclosure, the legacy CG timer runs for transmission on configured grant avoids data being stuck in MAC for too long as it might bring, for instance, reordering problem in higher layer as well as it avoids wasting resource on the packets not meeting the delay requirement, i.e., would be transmitted in vain after some time. The proposed HARQ process selection mechanism ensures the TB already built for the configured grant but stuck in the buffer due to LBT failure to be transmitted as soon as possible.

In this way, a new solution for the HARQ process selection is achieved to avoid the overwriting of the PDU. Meanwhile, two different timers may run at the same time when the transmission of a transport block is initiated, to control the HARQ processes on the configured grant resources.

More details of the example embodiments in accordance with the present disclosure will be described with reference to FIGS. 4-5.

Figure 4:
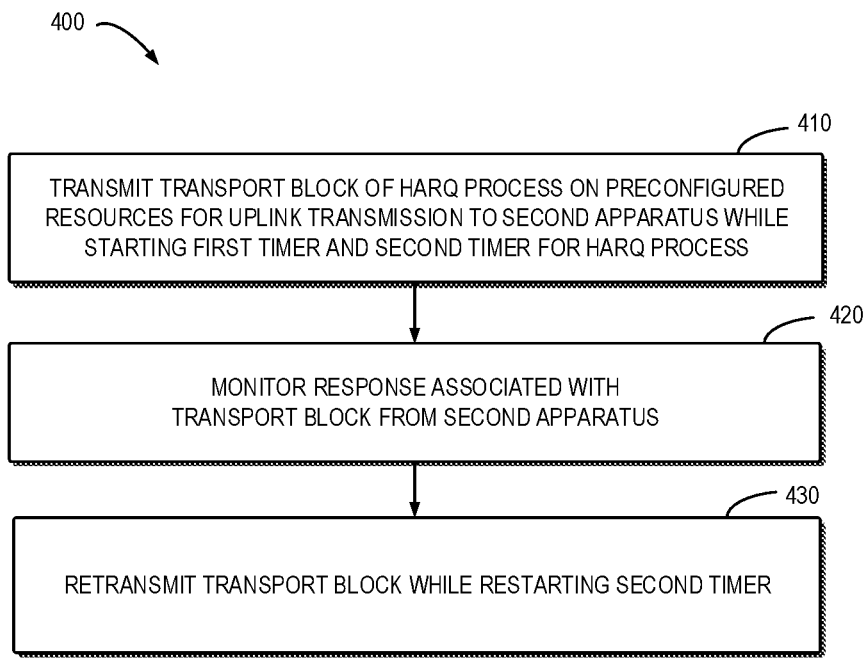
FIG. 4 shows a flowchart of an example method 400 of configured grant operation according to some example embodiments of the present disclosure.

FIG. 4 shows a flowchart of an example method 400 for configured grant operation according to some example embodiments of the present disclosure. The method 400 can be implemented at the terminal device 110 as shown in FIG. 1. For the purpose of discussion, the method 400 will be described with reference to FIG. 1.

At 410, the terminal device 110 transmits a transport block of a Hybrid Automatic Repeat Request process on preconfigured resources for an uplink transmission to a second apparatus while starting a first timer and a second timer for the Hybrid Automatic Repeat Request process, wherein the first timer indicates a time period during which the transport block is able to be retransmitted on the preconfigured resources, and wherein the second timer is configured to expire before the first timer.

At 420, the terminal device 110 monitors a response associated with the transport block from the network device 120.

At 430, if the second timer expires before receiving the response and before expiry of the first timer, the terminal device 110 retransmits the transport block while restarting the second timer.

In some example embodiments, the terminal device 110 may determine whether the preconfigured resources are available for retransmitting the transport block, the terminal device 110 may retransmit the transport block on the preconfigured resources.

In some example embodiments, the terminal device 110 may further restart the first timer upon retransmission of the transport block.

In some example embodiments, the terminal device 110 may further retransmit the transport block on the dynamic grant resource while restarting the first timer if the terminal device 110 receives the response from the network device 120 indicating a dynamic grant resource for retransmitting the transport block.

In some example embodiments, the response indicating a dynamic grant resource may be received on a Physical Downlink Control Channel.

In some example embodiments, the terminal device 110 may stop the second timer upon the reception of the response indicating a dynamic grant resource for retransmitting the transport block.

In some example embodiments, the terminal device 110 may stop both of the first timer and the second timer if the terminal device 110 receives the response from the network device 120 indicating a successful reception of the transport block.

In some example embodiments, the terminal device 110 may transmit the transport block on the preconfigured resources if the terminal device 110 determines that no prior transport block of a further Hybrid Automatic Repeat Request process.

In some example embodiments, the terminal device 110 may retransmit the at least one prior transport block on the preconfigured resources prior to transmitting the transport block if the terminal device 110 determines that at least one prior transport block of a further Hybrid Automatic Repeat Request process to be retransmitted.

In some example embodiments, the terminal device 110 may compare a first priority of the first prior transport block on a first Hybrid Automatic Repeat Request process and a second priority of the second prior transport block on a second Hybrid Automatic Repeat Request process if the terminal device 110 determines that a first prior transport block and a second prior transport block are to be retransmitted and retransmit the first prior transport block if the terminal device 110 determines that the first priority is higher than the second priority.

In some example embodiments, the first priority comprises a time priority indicating a time duration left for a retransmission of the first prior transport block on a first Hybrid Automatic Repeat Request process and the second priority comprises a time priority indicating a time duration left for a retransmission of the second prior transport block on a second Hybrid Automatic Repeat Request process.

In some example embodiments, the first priority comprises a logical channel priority of the first prior transport block on a first Hybrid Automatic Repeat Request process and the second priority comprises a logical channel priority of the second prior transport block on a second Hybrid Automatic Repeat Request process, wherein the logical channel priority indicates a highest priority among logical channels multiplexed in a transport block.

In some example embodiments, the first priority comprises a retransmission attempt priority indicating a number of retransmission times of the first prior transport block on a first Hybrid Automatic Repeat Request process and the second priority comprises a retransmission attempt priority indicating a number of retransmission times of the second prior transport block on a second Hybrid Automatic Repeat Request process.

Figure 5:
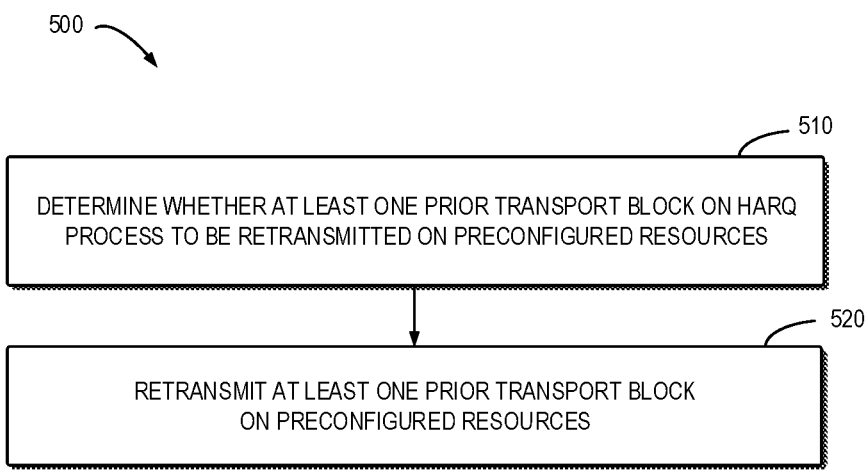
FIG. 5 shows a flowchart of an example method 500 of configured grant operation according to some example embodiments of the present disclosure.

FIG. 5 shows a flowchart of an example method 500 for configured grant operation according to some example embodiments of the present disclosure. The method 500 can be implemented at the terminal device 110 as shown in FIG. 1. For the purpose of discussion, the method 500 will be described with reference to FIG. 1.

At 510, the terminal device 110 determines whether at least one prior transport block of a Hybrid Automatic Repeat Request process to be retransmitted on preconfigured resources for an uplink transmission.

At 520, the terminal device 110 retransmit the at least one prior transport block on the preconfigured resources if the terminal device 110 determines at least one prior transport block to be retransmitted.

In some example embodiments, the terminal device 110 may compare a first priority of the first prior transport block on a first Hybrid Automatic Repeat Request process and a second priority of the second prior transport block on a second Hybrid Automatic Repeat Request process if the terminal device 110 determines that a first prior transport block and a second prior transport block are to be retransmitted and retransmit the first prior transport block if the terminal device 110 determines that the first priority is higher than the second priority.

In some example embodiments, the first priority comprises a time priority indicating a time duration left for a retransmission of the first prior transport block on a first Hybrid Automatic Repeat Request process and the second priority comprises a time priority indicating a time duration left for a retransmission of the second prior transport block on a second Hybrid Automatic Repeat Request process.

In some example embodiments, the first priority comprises a logical channel priority of the first prior transport block on a first Hybrid Automatic Repeat Request process and the second priority comprises a logical channel priority of the second prior transport block on a second Hybrid Automatic Repeat Request process, wherein the logical channel priority indicates a highest priority among logical channels multiplexed in a transport block.

In some example embodiments, the first priority comprises a retransmission attempt priority indicating a number of retransmission times of the first prior transport block on a first Hybrid Automatic Repeat Request process and the second priority comprises a retransmission attempt priority indicating a number of retransmission times of the second prior transport block on a second Hybrid Automatic Repeat Request process.

In some example embodiments, if the terminal device 110 determines that no prior transport block on the Hybrid Automatic Repeat Request process is to be retransmitted, the terminal device 110 may transmit a transport block on a further Hybrid Automatic Repeat Request process on the preconfigured resources while starting a first timer and a second timer for the further Hybrid Automatic Repeat Request process, wherein the first timer indicates a time period during which the transport block is able to be transmitted on the preconfigured resources, and wherein the second timer is configured to expire before the first timer.

In some example embodiments, if the terminal device 110 may monitor a response associated with the transport block from the network device 120 and retransmit the transport block while restarting the second timer if the second timer expires before receiving the response and before expiry of the first timer.

In some example embodiments, the terminal device 110 may determine whether the preconfigured resources are available for retransmitting the transport block and if the terminal device 110 determines that the preconfigured resources are available, the terminal device 110 may retransmit the transport block on the preconfigured resources.

In some example embodiments, the terminal device 110 may further restart the first timer upon retransmission of the transport block.

In some example embodiments, the terminal device 110 may further retransmit the transport block on the dynamic grant resource while restarting the first timer if the terminal device 110 receives the response from the network device 120 indicating a dynamic grant resource for retransmitting the transport block.

In some example embodiments, the response indicating a dynamic grant resource may be received on a Physical Downlink Control Channel.

In some example embodiments, the terminal device 110 may stop the second timer upon the reception of the response indicating a dynamic grant resource for retransmitting the transport block.

In some example embodiments, the terminal device 110 may stop both of the first timer and the second timer if the terminal device 110 receives the response from the network device 120 indicating a successful reception of the transport block.

In some example embodiments, an apparatus capable of performing the method 400 (for example, implemented at the terminal device 110) may comprise means for performing the respective steps of the method 400. The means may be implemented in any suitable form. For example, the means may be implemented in a circuitry or software module.

In some example embodiments, the apparatus comprises means for transmitting a transport block of a Hybrid Automatic Repeat Request process on preconfigured resources for an uplink transmission to a second apparatus while starting a first timer and a second timer for the Hybrid Automatic Repeat Request process, wherein the first timer indicates a time period during which the transport block is able to be retransmitted on the preconfigured resources, and wherein the second timer is configured to expire before the first timer; means for monitoring a response associated with the transport block from the second apparatus; and means for in response to the second timer expiring before receiving the response and before expiry of the first timer, retransmitting the transport block while restarting the second timer.

In some example embodiments, an apparatus capable of performing the method 500 (for example, implemented at the terminal device 110) may comprise means for performing the respective steps of the method 500. The means may be implemented in any suitable form. For example, the means may be implemented in a circuitry or software module.

In some example embodiments, the apparatus comprises means for determining, at the first apparatus, whether at least one prior transport block of a Hybrid Automatic Repeat Request process to be retransmitted on preconfigured resources for an uplink transmission; and means for in response to determining at least one prior transport block to be retransmitted, retransmitting the at least one prior transport block on the preconfigured resources.

Figure 6:
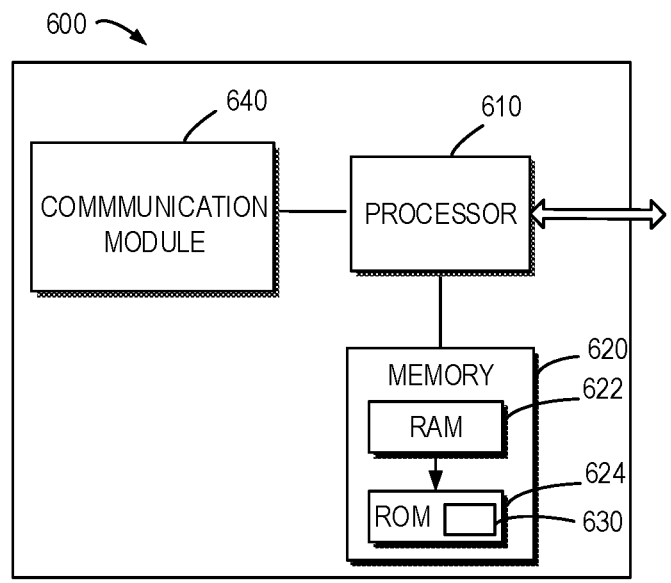
FIG. 6 shows a simplified block diagram of a device that is suitable for implementing example embodiments of the present disclosure.

FIG. 6 is a simplified block diagram of a device 600 that is suitable for implementing embodiments of the present disclosure. The device 600 may be provided to implement the communication device, for example the terminal device 110 as shown in FIG. 1. As shown, the device 600 includes one or more processors 610, one or more memories 640 coupled to the processor 610, and one or more transmitters and/or receivers (TX/RX) 640 coupled to the processor 610.

The TX/RX 640 is for bidirectional communications. The TX/RX 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 1020. The processor 610 may perform any suitable actions and processing by loading the program 630 into the RAM 620.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
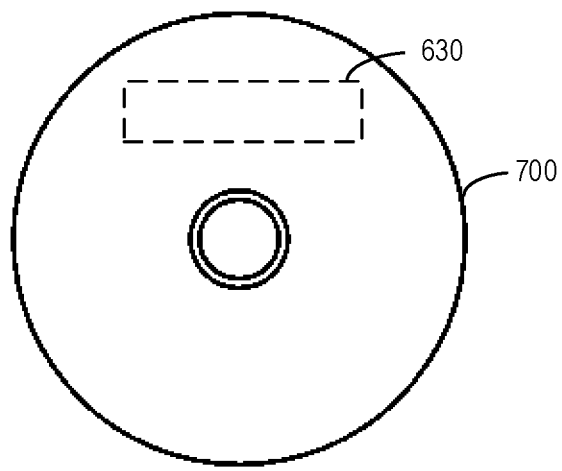
FIG. 7 shows a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500 and 600 as described above with reference to FIGS. 2-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus, comprising:
   at least one processor; and
   at least one memory including computer program codes;
   the at least one memory and the computer program codes are configured to, with the at least one processor, cause the first apparatus at least to:
   transmit a transport block of a hybrid automatic repeat request process on preconfigured resources for an uplink transmission to a second apparatus while starting a first timer and a second timer for the hybrid automatic repeat request process, wherein the first timer indicates a time period during which the transport block is able to be retransmitted, and wherein the second timer is configured to expire before the first timer;
   monitor a response associated with the transport block from the second apparatus; and
   in response to the second timer expiring before receiving the response and before expiry of the first timer, retransmit the transport block while restarting the second timer, wherein the at least one memory and the computer program codes are further configured to cause the first apparatus to
   in response to determining that at least one other transport block of a further hybrid automatic repeat request process associated with a selected hybrid automatic repeat request process identifier is to be retransmitted, retransmit the at least one other transport block on the preconfigured resources prior to transmitting the transport block.

2. The first apparatus of claim 1, wherein the at least one memory and the computer program codes are further configured to cause the first apparatus to
   determine whether the preconfigured resources are available for retransmitting the transport block; and
   in response to determining that the preconfigured resources are available, retransmit the transport block on the preconfigured resources.

3. The first apparatus of claim 1, wherein the at least one memory and the computer program codes are further configured to cause the first apparatus to restart the first timer upon retransmission of the transport block.

4. The first apparatus of claim 1, wherein the at least one memory and the computer program codes are further configured to cause the first apparatus to
   in response to receiving from the second apparatus the response, wherein the response indicates a dynamic grant resource for retransmitting the transport block, retransmit the transport block on the dynamic grant resource while restarting the first timer.

5. The first apparatus of claim 4, wherein the response is received on a physical downlink control channel.

6. The first apparatus of claim 4, wherein the at least one memory and the computer program codes are further configured to cause the first apparatus to stop the second timer upon the reception of the response.

7. The first apparatus of claim 1, wherein the at least one memory and the computer program codes are further configured to cause the first apparatus to
   in response to receiving the response, wherein the response indicates a successful reception of the transport block by the second apparatus, stop both of the first timer and the second timer.

8. The first apparatus of claim 1, wherein the at least one memory and the computer program codes are further configured to cause the first apparatus to
   in response to determining that no prior transport block of a further hybrid automatic repeat request process is to be retransmitted, transmit the transport block on the preconfigured resources.

9. The first apparatus of claim 1, wherein the at least one memory and the computer program codes are further configured to cause the first apparatus to
   in response to determining that a first prior transport block and a second prior transport block are to be retransmitted, compare a first priority of the first prior transport block on a first hybrid automatic repeat request process and a second priority of the second prior transport block on a second hybrid automatic repeat request process; and
   in response to determining that the first priority is higher than the second priority, retransmit the first prior transport block.

10. The first apparatus of claim 9, wherein the first priority comprises at least one of:
   a time priority indicating a time duration left for a retransmission of the first prior transport block on a first hybrid automatic repeat request process and the second priority comprises a time priority indicating a time duration left for a retransmission of the second prior transport block on a second hybrid automatic repeat request process;
   a logical channel priority of the first prior transport block on a first hybrid automatic repeat request process and the second priority comprises a logical channel priority of the second prior transport block on a second hybrid automatic repeat request process, wherein the logical channel priority indicates a highest priority among logical channels multiplexed in a transport block; or a retransmission attempt priority indicating a number of retransmission times of the first prior transport block on a first hybrid automatic repeat request process and the second priority comprises a retransmission attempt priority indicating a number of retransmission times of the second prior transport block on a second hybrid automatic repeat request process.

11. The first apparatus of claim 1, wherein the first apparatus comprises a terminal device and the second apparatus comprises a network device.

12. A first apparatus, comprising:
at least one processor; and
at least one memory including computer program codes;
the at least one memory and the computer program codes are configured to, with the at least one processor, cause the first apparatus at least to:
determine, at the first apparatus, whether at least one prior transport block on a hybrid automatic repeat request process to be retransmitted on preconfigured resources for an uplink transmission; and
in response to determining that at least one other transport block is to be retransmitted, retransmit the at least one other transport block on the preconfigured resources, wherein the at least one memory and the computer program codes are further configured to cause the first apparatus to
in response to determining that no prior transport block on the hybrid automatic repeat request process is to be retransmitted, transmit a transport block on a further hybrid automatic repeat request process associated with a selected hybrid automatic repeat request process identifier on the preconfigured resources while starting a first timer and a second timer for the further hybrid automatic repeat request process, wherein the first timer indicates a time period during which the transport block is able to be transmitted, and wherein the second timer is configured to expire before the first timer.

13. The first apparatus of claim 12, wherein the at least one memory and the computer program codes are further configured to cause the first apparatus to
in response to determining that a first prior transport block and a second prior transport block are to be retransmitted, compare a first priority of the first prior transport block on a first hybrid automatic repeat request process and a second priority of the second prior transport block on a second hybrid automatic repeat request process; and
in response to determining that the first priority is higher than the second priority, retransmit the first prior transport block.

14. The first apparatus of claim 13, wherein the first priority comprises at least one of:

a time priority indicating a time duration left for a retransmission of the first prior transport block on a first hybrid automatic repeat request process and the second priority comprises a time priority indicating a time duration left for a retransmission of the second prior transport block on a second hybrid automatic repeat request process;
a logical channel priority of the first prior transport block on a first hybrid automatic repeat request process and the second priority comprises a logical channel priority of the second prior transport block on a second hybrid automatic repeat request process, wherein the logical channel priority indicates a highest priority among logical channels multiplexed in a transport block; or
a retransmission attempt priority indicating a number of retransmission times of the first prior transport block on a first hybrid automatic repeat request process and the second priority comprises a retransmission attempt priority indicating a number of retransmission times of the second prior transport block on a second hybrid automatic repeat request process.

15. The first apparatus of claim 12, wherein the at least one memory and the computer program codes are further configured to cause the first apparatus to
monitor a response associated with the transport block from the second apparatus; and
in response to the second timer expiring before receiving the response and before expiry of the first timer, retransmit the transport block while restarting the second timer.

16. The first apparatus of claim 12, wherein the at least one memory and the computer program codes are further configured to cause the first apparatus to
determine whether the preconfigured resources are available for retransmitting the transport block; and
in response to determining that the preconfigured resources are available, retransmit the transport block on the preconfigured resources.

17. The first apparatus of claim 12, wherein the at least one memory and the computer program codes are further configured to cause the first apparatus to restart the first timer upon retransmission of the transport block.

18. The first apparatus of claim 12, wherein the at least one memory and the computer program codes are further configured to cause the first apparatus to
in response to receiving from the second apparatus the response, wherein the response indicates a dynamic grant resource for retransmitting the transport block, retransmit the transport block on the dynamic grant resource while restarting the first timer.

* * * * *